United States Patent [19]

Lerman

[11] Patent Number: 5,203,220

[45] Date of Patent: Apr. 20, 1993

[54] OPTICAL TRACKING AND STABILIZING SYSTEM WITH A GIMBAL MOUNTED MIRROR FOR ESTABLISHING A LINE OF SIGHT

[75] Inventor: Harold Lerman, Paramus, N.J.

[73] Assignee: GEC-Marconi Electronic Systems Corp., Wayne, N.J.

[21] Appl. No.: 887,860

[22] Filed: May 26, 1992

[51] Int. Cl.$^5$ .................. G01C 19/00; G01C 21/00
[52] U.S. Cl. .................. 74/5.22; 359/555; 364/453
[58] Field of Search .......... 74/5.22; 250/203.1, 250/203.2; 364/453; 244/3.16; 359/555

[56] References Cited

U.S. PATENT DOCUMENTS 3,931,515  1/1976  Parkin ............... 244/3.16 X
4,047,678  9/1977  Miller et al. ............ 244/3.16
4,881,800  11/1989  Fuchs et al. ............ 359/555

OTHER PUBLICATIONS

"Modern Control Methods Applied to a Line-of-Sight Stabilization and Tracking System", Haessig et al., American Control Conference, Jun. 1987, pp. 29-36.

Primary Examiner—Rodney H. Bonck
Attorney, Agent, or Firm—David L. Davis

[57] ABSTRACT

An optical tracking and stabilizing system which generates an error signal to control a gimbal set, which error signal has first and second components. The first error signal component is a low frequency domain position servo error signal and the second error signal component is a high frequency domain inertial stable platform error signal.

2 Claims, 5 Drawing Sheets

OPTICAL TRACKING AND STABILIZING SYSTEM WITH A GIMBAL MOUNTED MIRROR FOR ESTABLISHING A LINE OF SIGHT

BACKGROUND OF THE INVENTION

This invention relates to an optical tracking system for establishing a line of sight in accordance with a position command signal and, more particularly, to such a system which is stabilized against environmental vibrations and perturbations.

U.S. Pat. No. 4,881,800, the contents of which are hereby incorporated by reference herein, discloses an optical tracking and stabilizing system for use in an aircraft vehicle which tracks the movement of the pilot's helmet by developing a position command signal which causes the line of sight of the optical system to follow the line of sight of the pilot. In the disclosed system, a mirror is flexibly mounted to a rigid block which in turn is fixedly mounted to the inner gimbal of a pair of gimbals. A gyroscope having a spin axis aligned with the line of sight of the optical system is mounted to the rigid block to develop signals which are utilized to control movement of the mirror relative to the rigid block so as to nullify vibrations which emanate both from the gimbal system during the positioning of the rigid block and from the vehicle.

In the referenced system, a first error signal is generated and applied to the gimbal system to control movement of the rigid block relative to the vehicle and a second error signal is generated and applied to the mirror subassembly to control movement of the mirror relative to the rigid block. It would be desirable to provide an arrangement which requires only a single error signal to control both the rigid block gimbal set and the limited motion mirror subassembly. Further, if the rigid block gimbal set has appropriate performance characteristics, the limited motion mirror subassembly is not needed.

As described in the referenced patent, in order to track the input position command and isolate the line of sight from angular vibration of the vehicle, the optical tracking and stabilizing system must behave like a position servomechanism in the low frequency domain and like an inertial stable platform in the high frequency domain. It is therefore an object of the present invention to provide an optical tracking and stabilizing system of the type described which permits independent control of the low frequency response to position command inputs, permits independent control of the high frequency isolation of the line of sight from the vehicle angular vibration, and does not compromise the ability of the system to reject the effects of disturbance torques over the full range of the system's frequency bandwidth.

SUMMARY OF THE INVENTION

The foregoing, and additional, objects are attained in accordance with the principles of this invention by providing an optical tracking and stabilizing system for establishing and maintaining a line of sight in response to a position command signal, comprising a two-axis gimbal system controllable independently about each of its axes, a rigid block mounted to the gimbal system, a mirror mounted to the rigid block, gyroscope means mounted to the rigid block for providing a gyro rate signal about each of the axes of the gimbal system, means for providing a gimbal angle signal corresponding to the angular position of the rigid block about each of the axes of the gimbal system, and means for receiving an input line of sight position command signal which defines a desired line of sight position to be attained by the mirror. For each of the gimbal axes, there is provided means responsive to the gyro rate signal, the gimbal angle signal and the position command signal for generating an error signal to be applied to control the gimbal system. The error signal includes first and second components, with the first component passing through a high pass filter and corresponding to an inertial stable platform error signal based on the gyro rate signal, and the second component passing through a first low pass filter and corresponding to a position servo error signal based on the gimbal angle signal and the position command signal, wherein the high pass filter and the first low pass filter are mutually complementary. In accordance with aspect of this invention, the gimbal system is mounted to a vehicle and further comprises means for receiving a vehicle rate signal, means for passing the vehicle rate signal through a second low pass filter to obtain a first signal, means for generating a second signal which is the first derivative with respect to time of the position command signal, means for passing the second signal through a third low pass filter to obtain a third signal, means for summing the first and third signals to obtain a fourth signal, and means for subtracting the fourth signal from the gyro rate signal to obtain a fifth signal which is used to generate the first component of the error signal.

DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
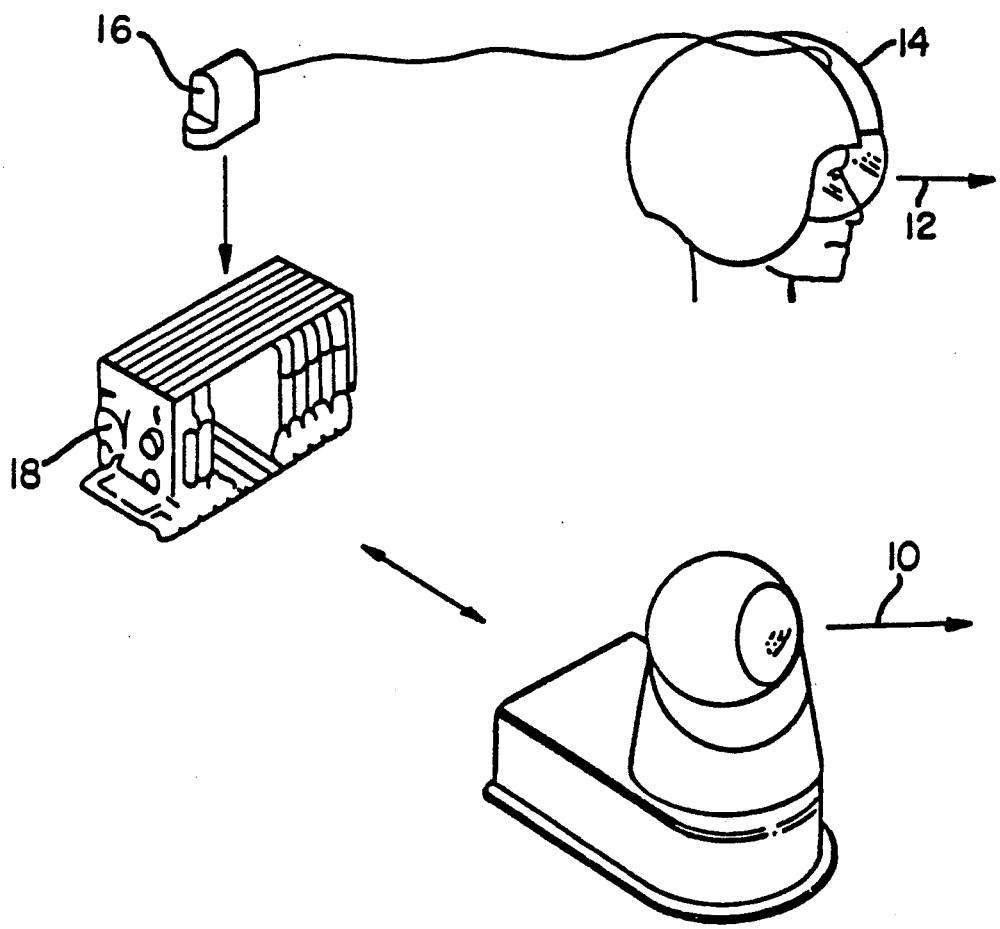
FIG. 1 is a pictorial depiction of a prior art optical tracking system in which the present invention may be incorporated.

FIG. 1 illustrates an aircraft night vision optical tracking system having a line of sight, shown by the arrow 10, which tracks the line of sight of the pilot, shown by the arrow 12. In this system, an infrared image is captured and displayed on a screen attached to the pilot's helmet 14. The pilot can focus on this screen or look through the screen, seeing either an infrared image or a normal image, respectively. Therefore, the line of sight 10 of the system must accurately track the line of sight 12 of the pilot to provide proper image registration. The position of the pilot's helmet 14 relative to the cockpit of the aircraft is sensed magnetically and is sent by the transmitter 16 to the system electronics 18 to provide a position command signal.

Figure 2:
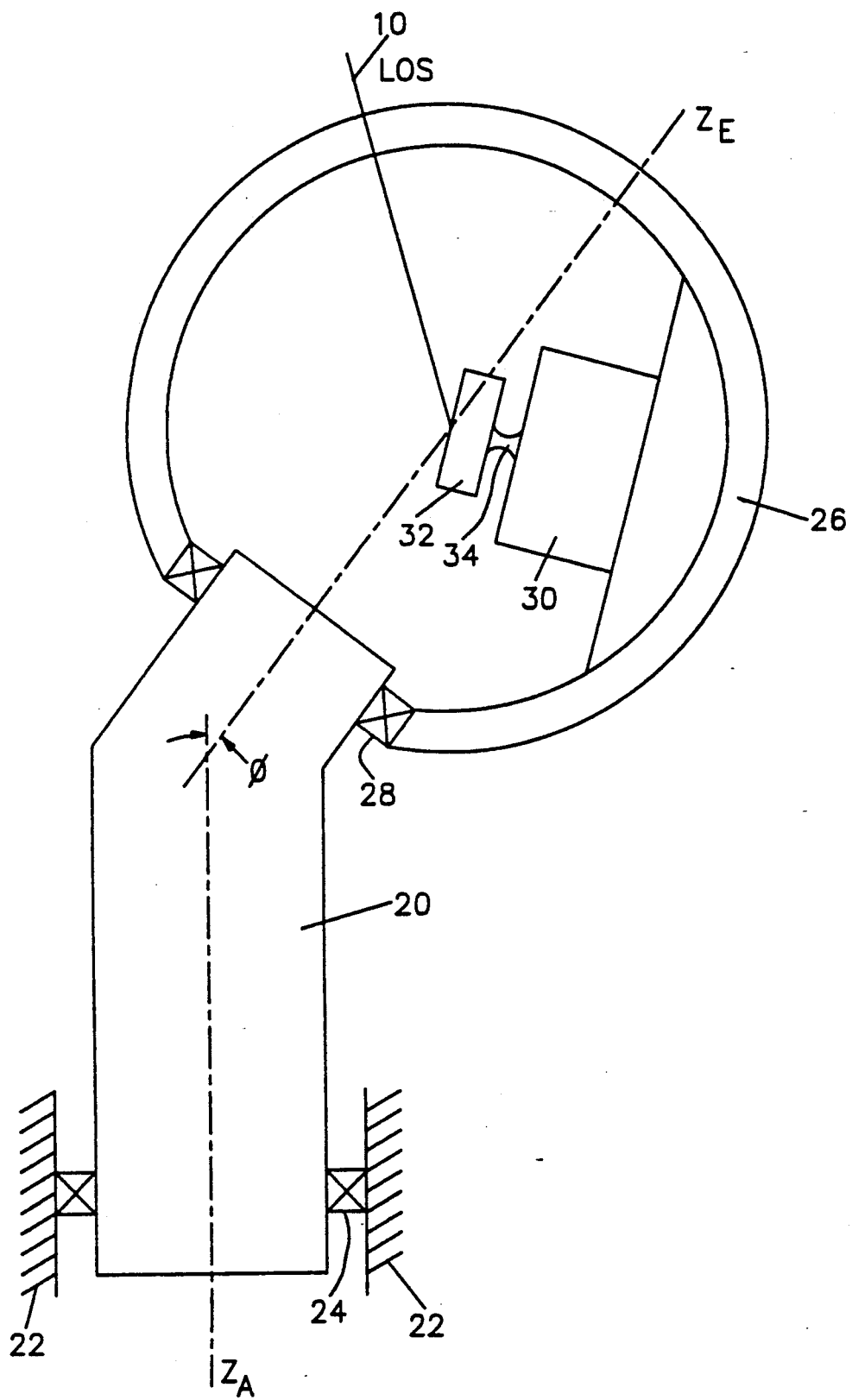
FIG. 2 illustrates the gimbal system of the optical tracking system of FIG. 1.

As best illustrated in FIG. 2, the mechanical portion of the optical tracking system includes an azimuth gimbal 20 mounted to the aircraft structure 22, which acts as a ground plane, via the bearings 24 so as to be rotatable about an azimuth axis of rotation $Z_A$. An elevation gimbal 26 is mounted to the azimuth gimbal 20 via the bearings 28 as to be rotatable about an elevation axis of rotation $Z_E$. The fixed angle between the axes of rotation $Z_A$ and $Z_E$ is denoted as $\phi$. In an orthogonal gimbal set, would be 90° degrees. However, in the system shown herein, the gimbal set is non-orthogonal and $\phi$ is illustratively 45° degrees.

Fixedly mounted to the elevation gimbal 26 is a rigid block 30. A mirror 32 is movably mounted to the rigid block 30 via a flexure hinge 34. The line of sight 10 of the tracking system is reflected off the mirror 32 at the same angle from the surface of the mirror 32 as that surface is to the elevation gimbal axis of rotation $Z_E$.

Figure 3:
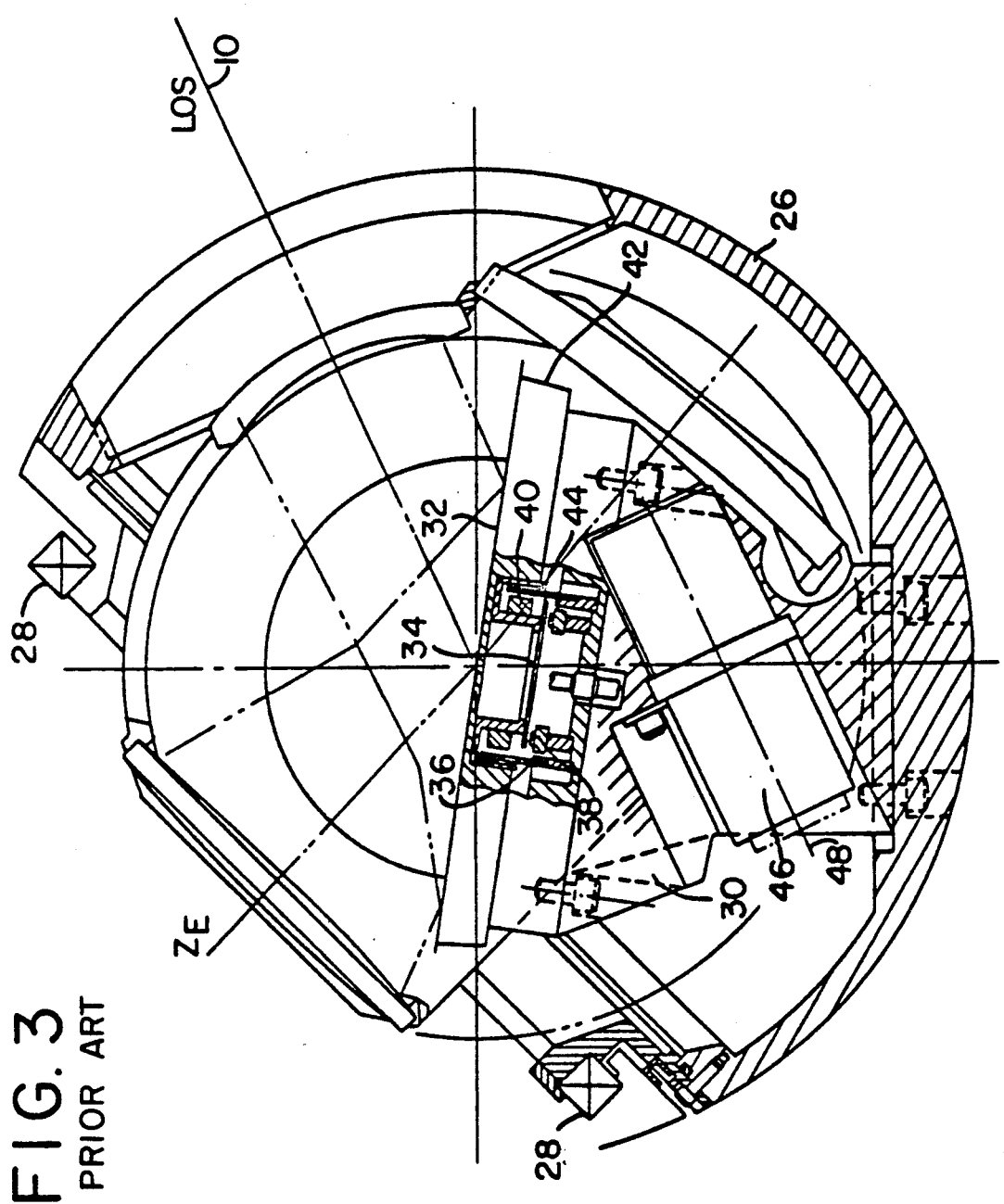
FIG. 3 is a detailed illustration showing the elevation gimbal, the rigid block and the mirror of FIG. 2.

FIG. 3 shows the elevation gimbal assembly in more detail. As shown therein, and as described in the aforereferenced U.S. Pat. No. 4,881,800, the mirror 32 is mounted to the rigid block 30 through the flexure hinge 34 which provides two axes of limited freedom and a small amount of restoring torque to the mirror 32. The end portion of the flexure hinge 34, as well as two pairs of torquer coils 36, is attached to the rigid block 30. Also attached to the block 30 are two pairs of proximity sensing pickoff coils 38. The pickoff and torquer coils 38, 36 are positioned concentrically with the flexure hinge 34 such that the two pairs of torquer coils 36 react with a permanent magnet ring 40, which is coupled to the underside of the mirror 32 within the mirror base 42. Similarly, the pickoff coils 38 react with a return path coil 44, also mounted to the mirror base 42.

Also included is a rate gyroscope 46 mounted to the rigid block 30 so that its spin axis 48 is parallel to the system line of sight 10, thereby providing rate information about two axes perpendicular to the line of sight 10. The gyroscope 46, in combination with high pass filters to be discussed hereinafter, is utilized to sense high frequency vibrational disturbances which result in jitter of the system line of sight 10. These vibrational effects arise from two sources. The first source is vehicle vibration. The second source is vibration generated by gimbal disturbance torques.

The line of sight tracking system with which the present invention is concerned uses a two axis gimbal set 20, 26 with adequate freedom of movement about each axis $Z_A$, $Z_E$ to satisfy the field of regard requirements. The two axis rate gyroscope 46 is mounted on the inner cluster 26 of the gimbal set to sense the inertial angular rate of the gimbals. The two axes of the gimbal set contain angle transducers to measure the relative angles of the gimbal set and the gimbal axes also contain torquers to drive the gimbals. The system contains control amplifiers to amplify the error signals and power the gimbal torquers. For high accuracy applications, the inner cluster contains a small, limited motion two axis gimbal set mounting the mirror 32 to the rigid block 30. The limited motion gimbal set has a better performance capability than the full motion gimbal set. Thus, it can be used to improve the overall performance of the total system. The output of the limited motion gimbal set is optically added to the position of the inner cluster of the large motion gimbal set to achieve the improved accuracy line of sight output. Two types of sensor signals are available from the line of sight tracking system, i.e., the gyroscope signal and the gimbal angle transducer signal. The gyroscope 46 measures the inertial angular rate of the gimbals. The gimbal mounted angle transducer measures the relative gimbal angle. The present invention uses the described gimbal sets to accomplish its purpose, which is to solve the problem of line of sight tracking and stabilizing by introducing a means of sensor signal processing which:

1. Permits independent control of the line of sight tracking and stabilizing system low frequency response to line of sight command inputs;

2. Permits independent control of the line of sight tracking and stabilizing system high frequency isolation of the line of sight from vehicle angular vibration; and 3. Does not compromise the ability of the line of sight tracking and stabilizing system to reject the effects of disturbance torques over the full range of the system's frequency bandwidth.

The line of sight tracking and stabilizing system contains two gimbal axes to permit tracking the desired line of sight. Each gimbal is in a control feedback loop. For the purpose of explaining this invention, it is necessary to only describe one control feedback loop. The total system, of course, contains the two loops with the described signal processing contained in each loop.

Figure 4:
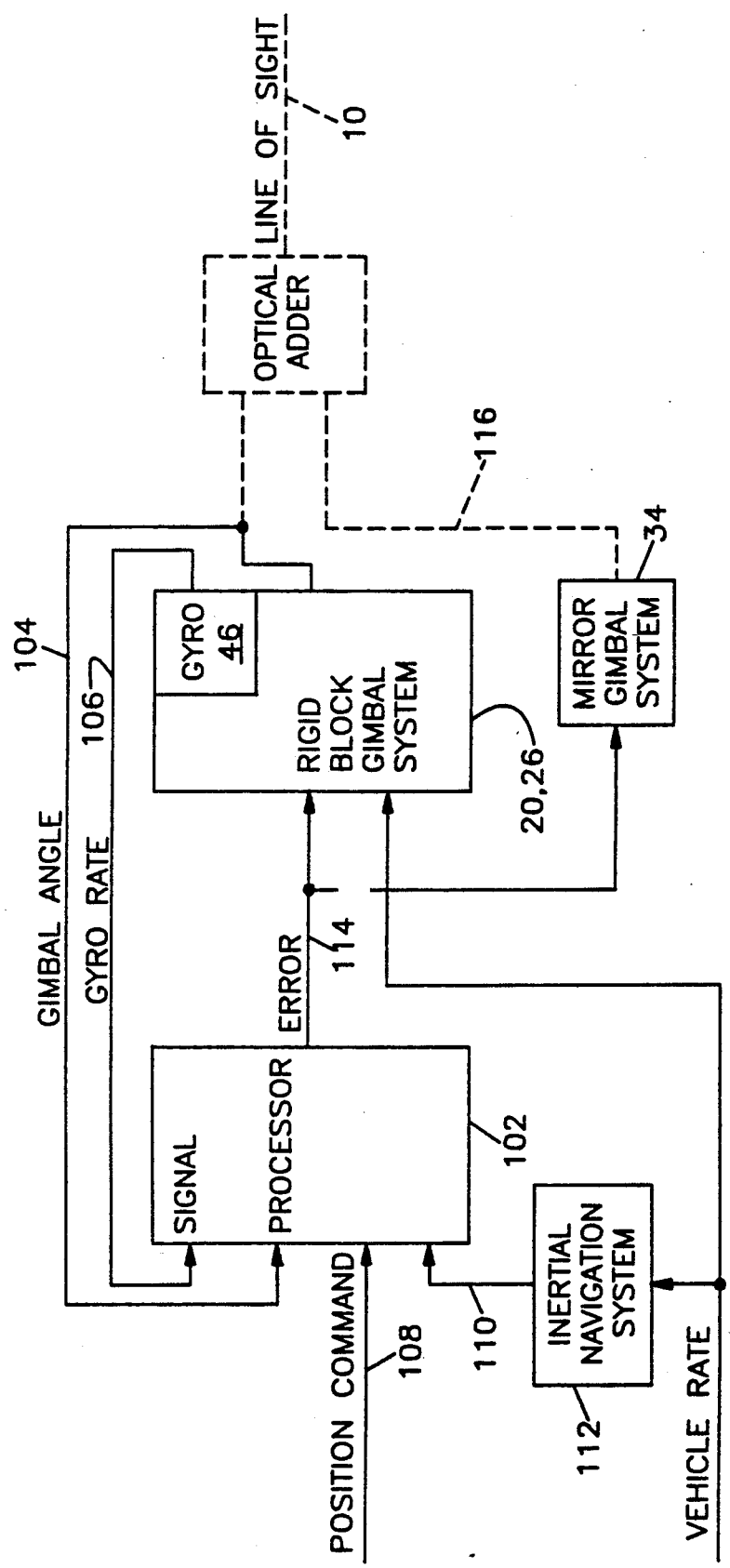
FIG. 4 is a general block diagram of an optical tracking and stabilizing system constructed according to this invention.

FIG. 4 illustrates a general block diagram of an optical tracking and stabilizing system constructed according to this invention. The present invention is incorporated within the signal processor 102. The signal processor 102 receives feedback sensor signals from a respective one of the rigid block gimbal systems 20, 26. These feedback sensor signals are the gimbal angle signal on the lead 104 from the gimbal axis transducer, and the gimbal, or gyro, rate signal on the lead 106 from the gyroscope 46 indicative of the gimbal inertial rate. The signal processor 102 also receives the input position command signal on the lead 108 and the vehicle rate signal on the lead 110 from the inertial navigation system 112 of the vehicle. Within the limits of its performance, the signal processor 102 drives the gimbals 20, 26 to force the error signal on the lead 114 to zero. The residual error signal on the lead 114 is also fed to the limited motion mirror gimbal system 34. The output of the mirror gimbal system 34 is the line of sight correction signal on the lead 116. The outputs of the rigid block gimbal system 20, 26 and the mirror system 34 are optically added to produce the system line of sight 10.

Figure 5:
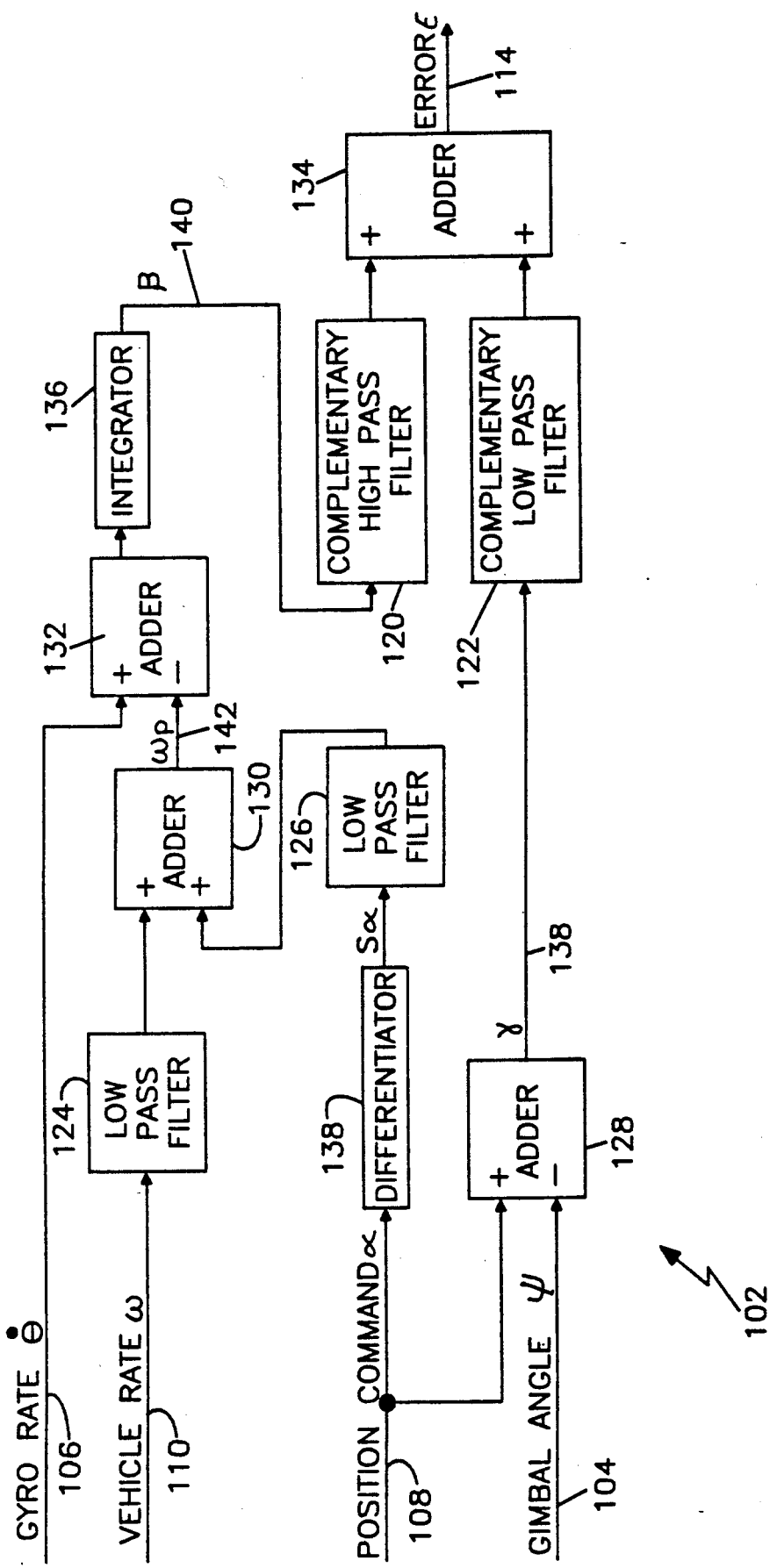
FIG. 5 is a block diagram of the signal processing portion of the system of FIG. 4.

FIG. 5 shows details of the signal processor 102 in block diagram form. However, it is understood that implementation of this design is preferably effected by a programmed computer. The signal processor 102 has four inputs 104, 106, 108 and 110, and one output 114. The output 114 represents the tracking and stabilizing system error signal $\epsilon$ and is the input to the gimbal systems shown in FIG. 4. The blocks shown in FIG. 5 represent transfer functions. The signal processor 102 includes the high pass filter 120 and the first low pass filter 122, which are mutually complementary. What this means is that the sum of the transfer functions for the filters 120 and 122 equals unity. The processor 102 also includes the second and third low pass filters 124 and 126, respectively, the adders 128, 130, 132 and 134, the integrator 136 and the differentiator 138. For the purposes of the following discussion, the definitions for the inputs, outputs and transfer functions are as follows:

$s$ = Laplace operator

-continued $\dot{\theta} = s\theta$ = gimbal inertial angular rate, integrator 136 input #1; (lead 106)

$\theta$ = gimbal inertial angle = line of sight with respect to inertial space $\omega$ = vehicle inertial rate; (lead 110)

$\int(\omega)dt = \frac{\omega}{s}$ = vehicle inertial angle $\psi = \theta - \int(\omega)dt$ = gimbal relative angle (transducer output) = $\theta - \frac{\omega}{s}$;

(lead 104)

= line of sight with respect to vehicle axes

= difference between vehicle and gimbal inertial angles $\alpha$ = line of sight command input with respect to vehicle axes $\gamma = \psi - \alpha$ = line of sight error; (lead 138)

$\beta = \theta - \frac{\omega P}{s}$ = integrator 136 output; (lead 140)

$CHPF(s)$ = transfer function for complementary high pass filter 120

$CLPF(s)$ = transfer function for complementary low pass filter 122 ($CHPF + CLPH = 1$ for complementary filters)

$\epsilon$ = system error = $(CHPF)\beta + (CLPF)\gamma$; (lead 114)

$LPF124(s)$ = low pass filter 124 transfer function $LPF126(s)$ = low pass filter 126 transfer function $\omega P$ = integrator 136 input #2 scaled in dimensions of angular rate
= $(LPF124)\omega + (LPF126)s\alpha$ $CHPF124$ = $1 - LPF124$ = complementary filter for $LPF124$ The operation of this invention can be explained by assuming that the tracking and stabilizing system error $\epsilon$ on the lead 114 is driven to zero by the full motion gimbal set 20 (or 26). For that error to be equal to zero, the values of the feedback terms on the leads 104 and 106 as a function of the input signals on the leads 108 and 110 are calculated. Performance limitations of the gimbal set will not drive the error to zero, but this does not invalidate this simple procedure for explaining the operation of this invention. The results illustrate the performance for a perfect gimbal set.

A quick review of conventional inertial stable platform operation and conventional position servo operation will help to explain the performance features of the inventive line of sight tracking and stabilizing system. First, observe the operation of an inertial stable platform. The integrator 136 output on the lead 140 is the error signal and is driven to zero by the gimbal set. This isolates the system from vehicle motion and drives the gimbal at a rate equal to the integrator input #2 (lead 142) command. For this situation:

$$\text{FOR A STABLE PLATFORM: } \beta = \theta - \frac{\omega P}{s} = 0 \quad (1)$$

or $$\theta = \frac{\omega P}{s} = \text{line of sight with respect to inertial space}$$

and $$\psi = \theta - \frac{\omega}{s} = \frac{\omega P}{s} - \frac{\omega}{s} = \text{line of sight with respect to vehicle}$$

Second, observe the operation of the position servo. Lead 138 (line of sight error) is the servo error signal and is driven to zero by the gimbal set. The line of sight output follows the line of sight command input on the lead 108 regardless of vehicle rate. For this situation:

$$\text{FOR A POSITION SERVO: } \gamma = \psi - \alpha = \theta - \frac{\omega}{s} - \alpha = 0 \quad (2)$$

or $$\theta = \alpha + \frac{\omega}{s} = \text{line of sight with respect to inertial space}$$

and $$\psi = \alpha = \text{line of sight with respect to vehicle}$$

For the stable platform, note that the inertial line of sight follows rate command regardless of vehicle rate. For the position servo, note that body line of sight follows the line of sight command input regardless of vehicle rate. Now observe the operation for the inventive mode of operation shown in FIG. 5. This mode may be termed a "hybrid" mode. In this case, the system error $\epsilon$ (lead 114) is driven to zero by the gimbal set. For the hybrid line of sight tracking and stabilizing system:

$$\epsilon = (CLPF)\gamma + (CHPF)\beta \quad (3)$$

$$= (CLPF)\left(\theta - \frac{\omega}{s} - \alpha\right) + (CHPF)\left(\theta - \frac{\omega P}{s}\right)$$

$$= CLPF(\psi - \alpha) + (CHPF)\left(\psi + \frac{\omega}{s} - \frac{\omega P}{s}\right) = 0$$

$$\theta = (CLPF)\left(\frac{\omega}{s} + \alpha\right) + (CHPF)\left(\frac{\omega P}{s}\right) = \text{line of sight with respect to inertial space}$$

and $$\psi = (CLPF)(\alpha) + (CHPF)\left(\frac{\omega P}{s} - \frac{\omega}{s}\right) = \text{line of sight with respect to vehicle}$$

Note that the use of the complementary filters 120, 122 in the signal processor 102 causes the resultant system to behave like an inertial stable platform in the high frequency domain (see equation set (1)) and like a position servo in the low frequency domain (see equation set (2)). The complementary filters 120, 122 accomplish an additional important function. All three configurations (stable platform, position servo, and hybrid tracking and stabilizing system) reject the effects of disturbance torque equally. The use of complementary filters 120, 122 in the signal processor 102 keeps the loop gain of the hybrid system equal to the loop gain of the stable platform and position servo. Thus, the disturbance torque rejection ability remains the same for all three systems.

However, the use of the complementary filters 120, 122 does not permit independent control of the frequency response to vehicle angular vibration rejection and frequency response to the line of sight command input. The corner frequencies for the high and low pass filters 120, 122 are equal. The use of the command rate signal (lead 142) permits the system to have independent control of the hybrid system frequency response to line of sight command inputs and vehicle angular vibration rejection. Set the command rate equal to the terms defined in the definition and shown in FIG. 5, lead 142. For this situation:

$$\text{FOR: } \omega_P = (LPF124)\omega + (LPF126)s\alpha \quad (4)$$

$$\psi = \{(CLPF) + (CHPF)(LPF126)\}\alpha + (CHPF)(LPF124 - 1)\frac{\omega}{s}$$

$$\psi \approx (LPF126)\alpha - (CHPF)(CHPF124)\frac{\omega}{s} = \text{line of sight with respect to vehicle}$$

If the bandwidth of the low pass filter 126 is greater than that of the filter 122, the high pass filter 120 effectively extends the equivalent bandwidth to that of the low pass filter 126. The system response to the line of sight command input is now controlled by the low pass filter 126.

The rejection of vehicle rate effects in the low frequency domain can be enhanced by the use of the low pass filter 124. It has the effect of creating its complementary high pass filter to increase the rejection of vehicle rate in the low frequency (line of sight tracking) domain while maintaining line of sight stabilization in the high frequency (stable platform) domain.

The third line in equation set (4) shows the additional degrees of freedom achieved when using the low pass filters 124 and 126. Compare this line to the last line in equation set (3).

Accordingly, there has been disclosed an improved optical tracking and stabilizing system for establishing and maintaining a line of sight in response to a position command signal. While an exemplary embodiment has been disclosed herein, it will be appreciated by those skilled in the art that various modifications and adaptations to the disclosed embodiment may be made and it is only intended that this invention be limited by the scope of the appended claims.

I claim:

1. An optical tracking and stabilizing system for establishing and maintaining a line of sight in response to a position command signal, comprising:
   a two-axis gimbal system controllable independently about each of its axes;
   a rigid block mounted to said gimbal system;
   a mirror mounted to said rigid block;
   gyroscope means mounted to said rigid block for providing a gyro rate signal about each of the axes of said gimbal system;
   means for providing a gimbal angle signal corresponding to the angular position of said rigid block about each of the axes of said gimbal system;
   means for receiving an input line of sight position command signal which defines a desired line of sight position to be attained by said mirror; and
   for each of said gimbal axes, means responsive to said gyro rate signal, said gimbal angle signal and said position command signal for generating an error signal to be applied to control said gimbal system, said error signal including first and second components, said first component passing through a high pass filter and corresponding to an inertial stable platform error signal based on said gyro rate signal, and said second component passing through a first low pass filter and corresponding to a position servo error signal based on said gimbal angle signal and said position command signal, wherein said high pass filter and said first low pass filter are mutually complementary.

2. The system according to claim 1 wherein said gimbal system is mounted to a vehicle and further comprising:
   means for receiving a vehicle rate signal;
   means for passing said vehicle rate signal through a second low pass filter to obtain a first signal;
   means for generating a second signal which is the first derivative with respect to time of said position command signal;
   means for passing said second signal through a third low pass filter to obtain a third signal;
   means for summing said first and third signals to obtain a fourth signal; and
   means for subtracting said fourth signal from said gyro rate signal to obtain a fifth signal which is used to generate said first component of said error signal.

* * * * *